United States Patent
Jha et al.

(10) Patent No.: US 11,159,655 B1
(45) Date of Patent: Oct. 26, 2021

(54) TECHNIQUES FOR ENHANCING THE UDP NETWORK PROTOCOL TO EFFICIENTLY TRANSMIT LARGE DATA UNITS

(71) Applicant: NVIDIA Corporation, Santa Clara, CA (US)

(72) Inventors: Ashutosh Jha, Sunnyvale, CA (US); Srinivas Ramachandran, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 11 days.

(21) Appl. No.: 16/859,714

(22) Filed: Apr. 27, 2020

(51) Int. Cl.
*H04L 29/06* (2006.01)
*H04L 12/733* (2013.01)

(52) U.S. Cl.
CPC .............. *H04L 69/22* (2013.01); *H04L 45/20* (2013.01); *H04L 69/161* (2013.01); *H04L 69/164* (2013.01)

(58) Field of Classification Search
CPC ... H04L 47/32; H04L 47/2441; H04L 49/351; H04L 49/3009; H04L 67/00; H04L 67/02; H04L 69/16; H04L 69/161; H04L 69/166; H04L 69/22; H04L 69/164; H04L 12/28; H04L 12/56; H04L 12/5693; H04L 29/06; H04L 29/0653; H04L 45/00; H04L 47/10; H04L 47/30; H04L 12/733; H04L 45/20; G06F 13/00

USPC .......................................... 370/235, 389, 392
See application file for complete search history.

(56) References Cited

U.S. PATENT DOCUMENTS

| 2005/0286517 | A1* | 12/2005 | Babbar | .................. H04L 45/00 370/389 |
| 2008/0075079 | A1* | 3/2008 | Smith | .................. H04L 63/123 370/392 |
| 2009/0110003 | A1* | 4/2009 | Julien | .................. H04L 69/166 370/476 |
| 2015/0349927 | A1* | 12/2015 | Cohn | .................. H04L 1/0083 714/748 |

* cited by examiner

*Primary Examiner* — Robert B Harrell
(74) *Attorney, Agent, or Firm* — Shook, Hardy & Bacon L.L.P.

(57) ABSTRACT

A user datagram protocol (UDP) is a well-known protocol for transferring data between two nodes of a network. When data is too large to fit within a single UDP packet that can be transmitted between the two nodes, the data needs to be segmented and transmitted with multiple packets and reassembled on the receiving node. Techniques are disclosed herein, for example, for offloading such segmentation, transmission, and reassembly from the central processing units (CPUs) of the nodes. Such offloading is performed efficiently, for example, by repurposing legacy protocol fields used in UDP transmission such as the internet protocol (IP) identification (ID), time to live (TTL), type of service (TOS), and/or EtherType fields to encode information needed for efficient segmentation, out of order reception, and reassembly.

20 Claims, 7 Drawing Sheets

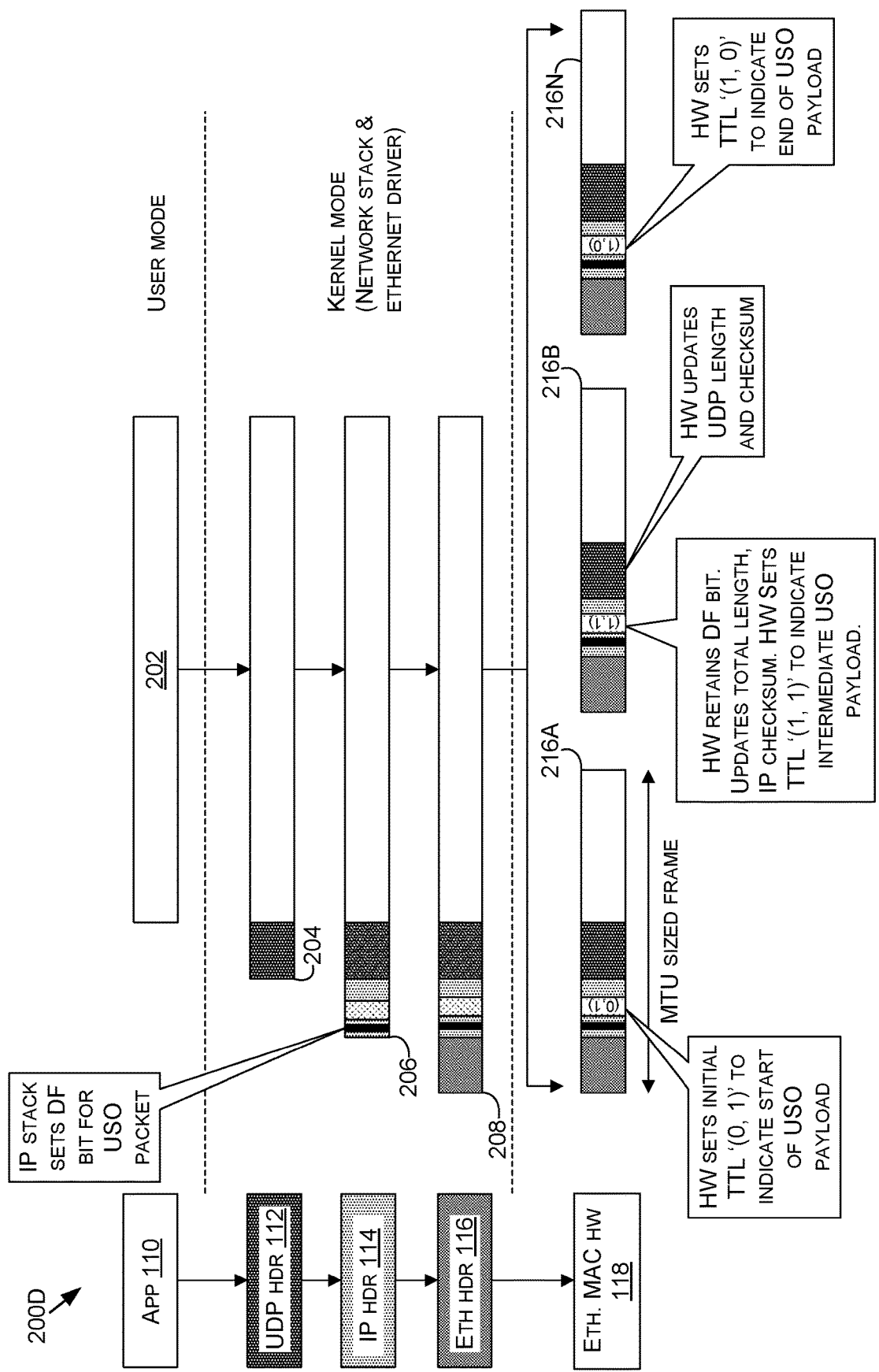

TECHNIQUES FOR ENHANCING THE UDP NETWORK PROTOCOL TO EFFICIENTLY TRANSMIT LARGE DATA UNITS

BACKGROUND

Data packets (or datagrams) are typically processed by running each packet through an operating system's network stack, which is layered to process each header in the packet—e.g., an Ethernet header, an internet protocol (IP) header, and a transmission control protocol (TCP)/user datagram protocol (UDP) header. Due to the requirement of processing each packet header, high bandwidth network interfaces may result in high central processing unit (CPU) utilization as the CPU processes a large number of packets. As a result, various solutions may be implemented to offload some of the processing from the CPU onto another hardware component(s)—such as the network medium access control (MAC) hardware. For example, segmentation offload has been implemented—primarily for TCP connections, which are inherently sequenced—such that the network stack running on the CPU only processes one large TCP payload, and the network MAC hardware takes care of segmenting the larger TCP payload into maximum segment size (MSS) portions that can be accommodated in the maximum transfer unit (MTU) of the underlying Ethernet medium, while updating the TCP/IP headers according to the segmentation performed.

However, for UDP traffic, segmentation offload is more challenging as there is no built in or inherent sequencing in UDP payloads. For example, where an application sends a large UDP payload to the network stack, and the stack—executing on the CPU—adds one UDP header to the large payload, and passes the payload to the network MAC hardware, the payload may not be capable of accurate reconstruction. For example, the MAC hardware may segment the UDP payload into MTU sized frames, with each frame carrying an IP/UDP header with appropriate fields modified depending on the segmentation. However, these individual MTU sized frames may still get lost/routed out of order over the network during transmission and thus may not arrive at the receiver according to the order of transmission. As a result, and because the UDP/IP header information does not include sequencing information, the reassembly of the original UDP payload that the application sent to the network stack may not be possible (e.g., because frames may be missing without knowledge) and/or because received frames may be out of order and the correct order is unknown.

To account for this, some conventional systems require each application using the network stack to be fully-aware of the underlying offload capability and operation. For example, metadata may be encoded in the payload itself that aids the offload-aware application detect out or order or badly re-assembled payloads. However, these operations require rewriting of applications and, depending on how the particular hardware of the sender segments the payload, the applications may still be unable to accurately process the data.

SUMMARY

Embodiments of the present disclosure relate to efficient techniques for sequence-aware user datagram protocol (UDP) segmentation offload (USO). Systems and methods are disclosed that re-purpose legacy header fields to render UDP segmentation offload (USO) sequence-aware such that original payloads generated by an application and transmitted over a network may be re-assembled at a receiver with confidence and accuracy.

In contrast to conventional systems, such as those described above, legacy bit definitions in Ethernet and/or internet protocol (IP) headers may be modified—and associated hardware may be configured to perform such modifications—to encode sequencing information among individual frames of a larger UDP payload. The modifications may be encoded such that typical routing and forwarding of individual frames of a larger UDP payload are not affected—thereby allowing the systems and methods described herein to be transparent to applications such that they do not need to be rewritten or updated to account for or make use of the USO capability. As a result, CPU utilization for processing high bandwidth UDP traffic—such as in automotive systems, storage networks (e.g., network attached storage (NAS)), etc.—may be reduced to improve overall system performance while maintaining a same system semantic state.

BRIEF DESCRIPTION OF THE DRAWINGS

The present systems and methods for efficient techniques for sequence-aware user datagram protocol (UDP) segmentation offload (USO) are described in detail below with reference to the attached drawing figures, wherein:

FIGS. 2A-2D depict visualizations of generating maximum transmission unit (MTU) sized packets in a sequence-aware UDP networking system, in accordance with embodiments of the present disclosure;

DETAILED DESCRIPTION

Systems and methods are disclosed related to efficient techniques for sequence-aware user datagram protocol (UDP) segmentation offload (USO). Although described herein primarily with respect to automotive and data center application, this is for example purposes only, and the systems and methods described herein may be implemented in any UDP-based network solution. In addition, although the use of Ethernet is primarily described herein for a data link layer, this is not intended to be limiting, and the present systems and methods may additionally or alternatively implement serial line internet protocol (SLIP), point-to-point protocol (PPP), and/or another protocol type at a data link layer of the UDP network stack.

The systems and methods described herein may be implemented such that they are transparent to applications. For example, applications do not have to be aware of the UDP sequencing and the USO that is taking place. As such, because the network stack may be configured to process the sequenced frames, and to account for out of sequence and/or lost frames, the application may be oblivious to the sequencing that was encoded in the received frames. In addition, the systems and methods described herein may be backwards compatible with existing network architectures, such that if a UDP packet is received that is segmented and sequenced, but the receiving hardware is not configured for such segmentation, the receiving hardware may still process the packets as a normal UDP packet. As a result, communication between receivers and transmitters that are both configured for the sequencing described herein and those that are not—e.g., where the receiver is not and the transmitter is configured for USO—the transmission and receipt of UDP packets may still occur seamlessly. In addition, although the present systems and methods apply to USO, the implementation of USO is such that existing transmission control protocol segmentation offload (TSO) hardware may be re-used—with minor adjustments, in embodiments—to perform the USO described herein.

Figure 1:
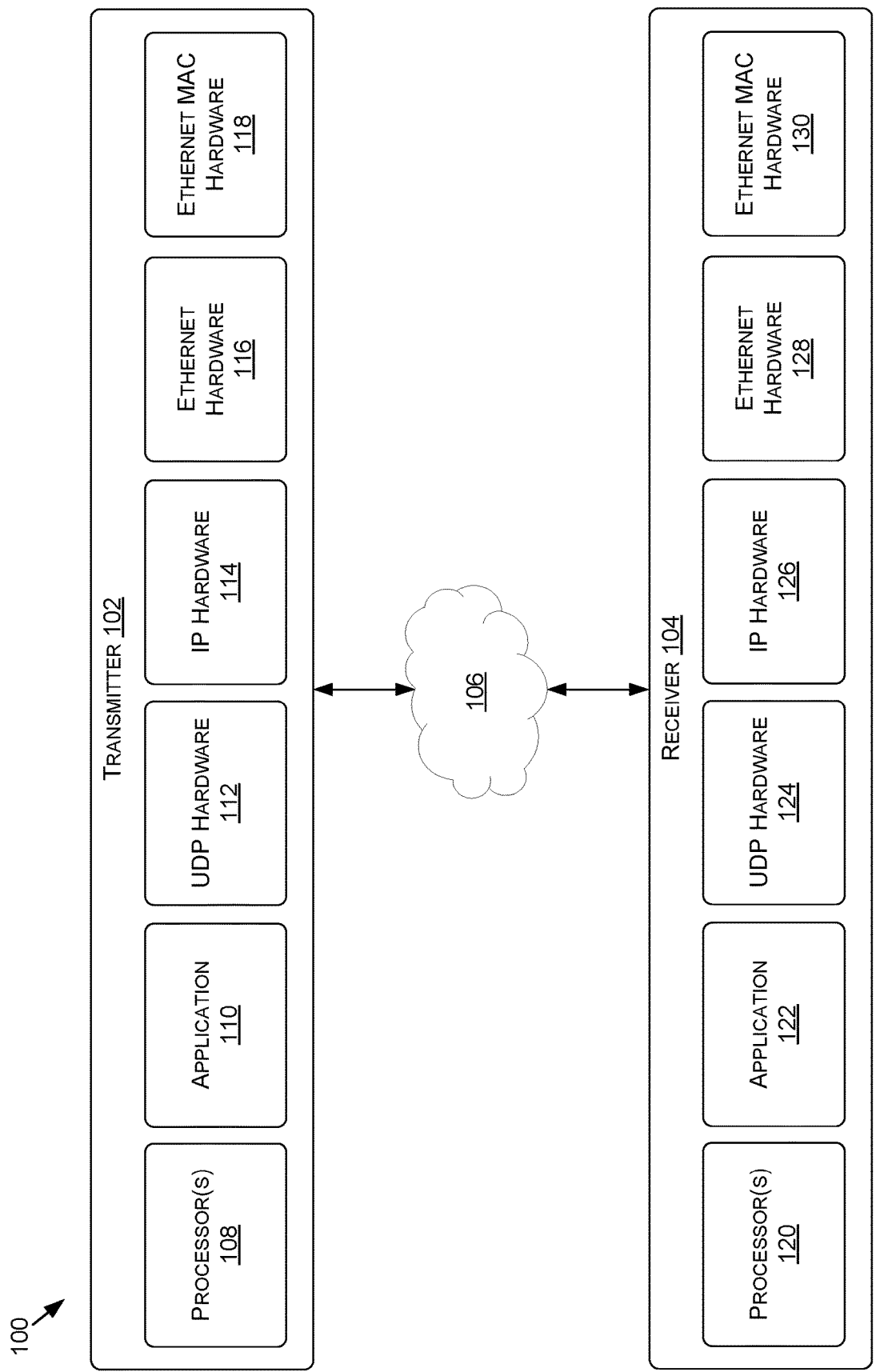
FIG. 1 depicts a block diagram of a sequence-aware UDP networking system, in accordance with embodiments of the present disclosure.

Now with reference to FIG. 1, FIG. 1 depicts an example sequence-aware UDP networking system 100 (alternatively referred to herein as "system 100"), in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. In some embodiments, the system 100 (e.g., a transmitter 102, a receiver 104, etc.) may include some or all of the components of example computing device 400 of FIG. 4, or may include additional or alternative components to those of the example computing device 400.

The system 100 may include a transmitter 102 and a receiver 104 that are communicatively coupled over a network(s) 106—such as, without limitation, a local area network (LAN, a wide area network (WAN), a low power wide area network (LPWAN), a personal area network (PAN), a storage area network (SAN), a system area network (SAN), a metropolitan area network (MAN), a campus area network (CAN), a virtual private network (VPN), an enterprise private network (EPN), and/or a passive optical local area network (POLAN). The connection over the network(s) 106 between the transmitter 102 and the receiver 104 may include a wired connection, a wireless connection, or a combination thereof.

The transmitter 102 and the receiver 104 may each include a physical device or component within the system 100, and/or may each represent a separate system including any number of devices and/or components. For example, in some embodiments, each of the transmitter 102 and the receiver 104 may include components of a larger system— such as components of an automobile that communicate over an Ethernet connection, or components of a data store (e.g., network storage, such as a network attached storage (NAS)). In other embodiments, the transmitter 102 may correspond to a transmission device of a first system and the receiver 104 may correspond to a receiving device of a second system. As such, the transmitter 102 and the receiver 104 may be co-located and may communicate over a local— wired and/or wireless connection—and/or may be located remotely with respect to one another (e.g., a client node and a host node, such as in a distributed or cloud computing environment). The transmitter 102 and the receiver 104 may thus include any two components, devices, and/or systems that may be capable of communicating using UDP. Although referred to as a transmitter and receiver, this is not intended to be limiting, and the transmitter 102 may be a receiver when receiving data and the receiver 104 may be a transmitter when transmitting data. However, for clarity purposes, the transmitter 102 and the receiver 104 are labeled as such.

The transmitter 102 and the receiver 104 may include a processor(s) 108 and 120, respectively, such as one or more central processing units (CPUs) and/or graphics processing units (GPUs). In some embodiments, in order to reduce the processing burden on the processor(s) 108 and/or 120, USO may be executed—such as by leveraging Ethernet medium access control (MAC) hardware 118, 130, Ethernet hardware 116, 128, IP hardware 114, 126, and/or UDP hardware 112. In some embodiments, one or more of the hardware components described herein may correspond to a network interface card (NIC).

The applications 110, 122 of the transmitter 102 and the receiver 104, respectively, may include any applications that generate application data for transmitting over a network(s) 106. For example, the application(s) 110, 122 may include, without limitation, a tunneling (e.g., VPN tunneling) application, a media streaming application, a game or game streaming application, a local broadcast mechanism application, an application within a NAS operating system, and/or an application executing within an automotive system—such as non-autonomous automotive system, a semi-autonomous automotive system (e.g., an advanced driver assistance system (ADAS), and/or an autonomous automotive system—for communication across Ethernet, controller area network (CAN) over Ethernet, etc. The applications 110, 122, may generate and/or decode application data 202 (FIGS. 2A-2D) and/or an application layer header for a UDP packet.

The UDP hardware 112, 124 of the transmitter 102 and the receiver 104, respectively, may correspond to hardware configured for generating and/or decoding a UDP header 204 (FIGS. 2A-2D) of a UDP packet. The UDP header 204 may include data (e.g., header fields) representing a source port (e.g., 16 bits), a destination port (e.g., 16 bits), a length (e.g., 16 bits), and a checksum (e.g., 16 bits), for a total of 64 bits, or 8 bytes. However, depending on the embodiment and the system configuration of the transmitter 102 and the receiver 104, the UDP header 204 may include additional and/or alternative header fields and/or more or less bits for each of the respective header fields.

The IP hardware 114, 126 of the transmitter 102 and the receiver 104, respectively, may correspond to hardware configured for generating and/or decoding an IP header 206 (FIGS. 2A-2D) and/or another type of network layer header (e.g., ARP, RARP, ICMP, IGMP, etc.), depending on the embodiment. The IP header 206 may include data (e.g., header fields) representing a version of the IP protocol (e.g., IPv4, IPv6, etc.) (e.g., 4 bits), a header length (e.g., 4 bits), a priority and type of service (TOS) (e.g., 8 bits, first 3 bits for priority and last five for TOS), an identification (e.g., 16 bits), flags (e.g., 3 bits, including a don't fragment (DF) bit), a fragmented offset (e.g., 13 bits), a time to live (TTL) (e.g., 8 bits), a protocol (e.g., TCP or UDP) (e.g., 8 bits), a header checksum (e.g., 16 bits), a source IP address (e.g., 32 bits), a destination IP address (e.g., 32 bits), and options (e.g., 32 bits). However, depending on the embodiment and the system configuration of the transmitter 102 and the receiver 104, the IP header 206 may include additional and/or alternative header fields and/or more or less bits for each of the respective header fields.

In some embodiments, as described in more detail herein with respect to FIG. 2A-2D, the IP hardware 114 may be modified to encode the IP ID bits, the TTL bits, the DF bit, and/or the TOS bits of the IP header 206 to indicate a start of a UDP sequence, an end of a UDP sequence, an intermediate packet from a UDP sequence, that a received packed is sequenced, and/or other information with respect to a sequence-aware UDP transmission.

The Ethernet hardware 116, 128 of the transmitter 102 and the receiver 104, respectively, may correspond to hardware configured for generating and/or decoding an Ethernet header 208 (FIGS. 2A-2D) and/or another type of data link layer header (e.g., PPP, HDLC, ADCCP, etc.), depending on the embodiment. The Ethernet header 208 may include data (e.g., header fields) representing a preamble (e.g., 7 bytes), a start of frame delimiter (SFD) (e.g., 1 byte), a destination address (e.g., 6 bytes), a source address (e.g., 6 bytes), an EtherType (e.g., 2 bytes), a length (e.g., 2 bytes), data (e.g., IP header 206, application data 202, or a portion thereof, etc.) (e.g., 46-1500 bytes), and cyclic redundancy check (CRC) (e.g., 4 bytes). However, depending on the embodiment and the system configuration of the transmitter 102 and the receiver 104, the Ethernet header 208 may include additional and/or alternative header fields and/or more or less bits for each of the respective header fields.

Figure 2A:
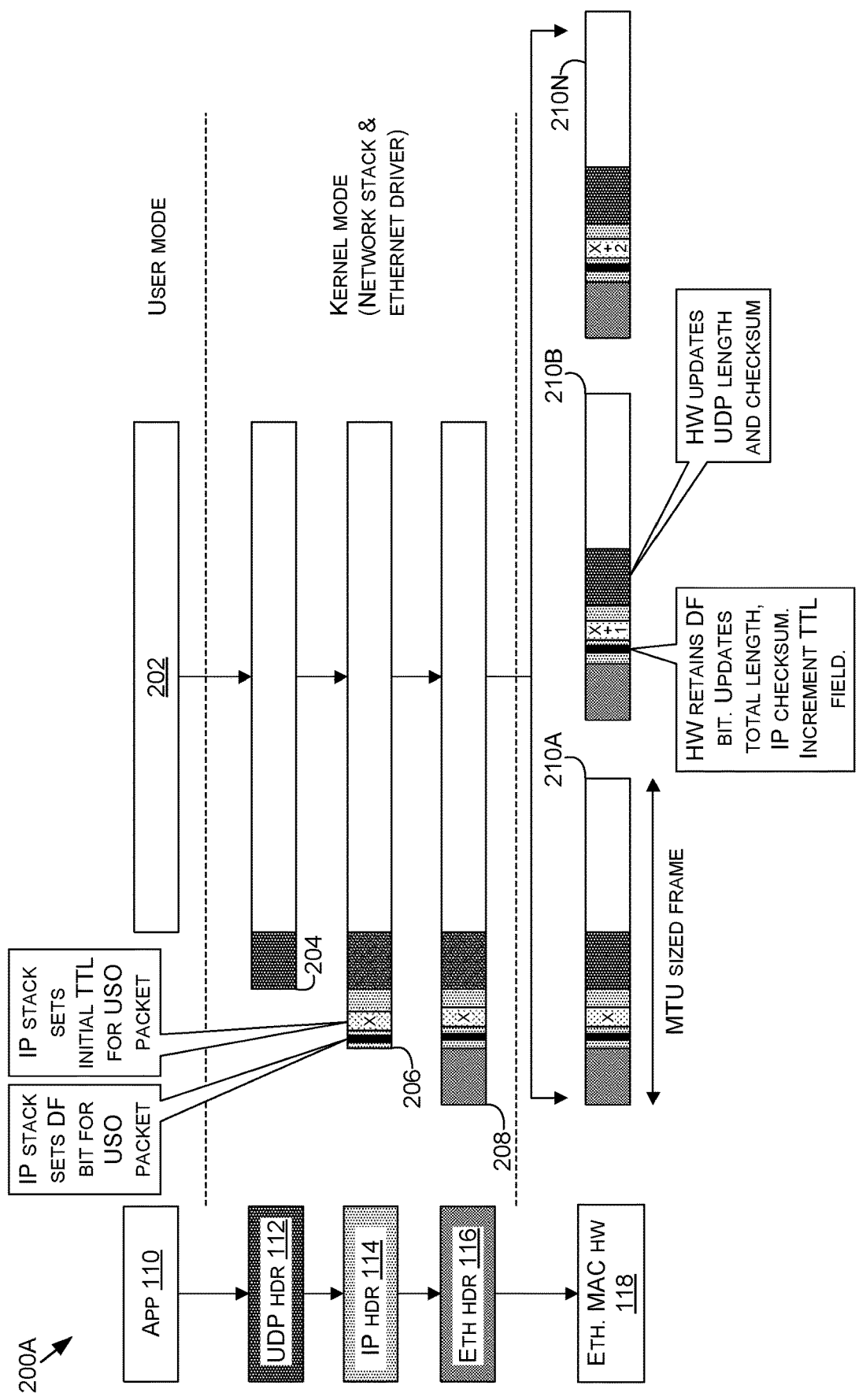
Figure 2B:
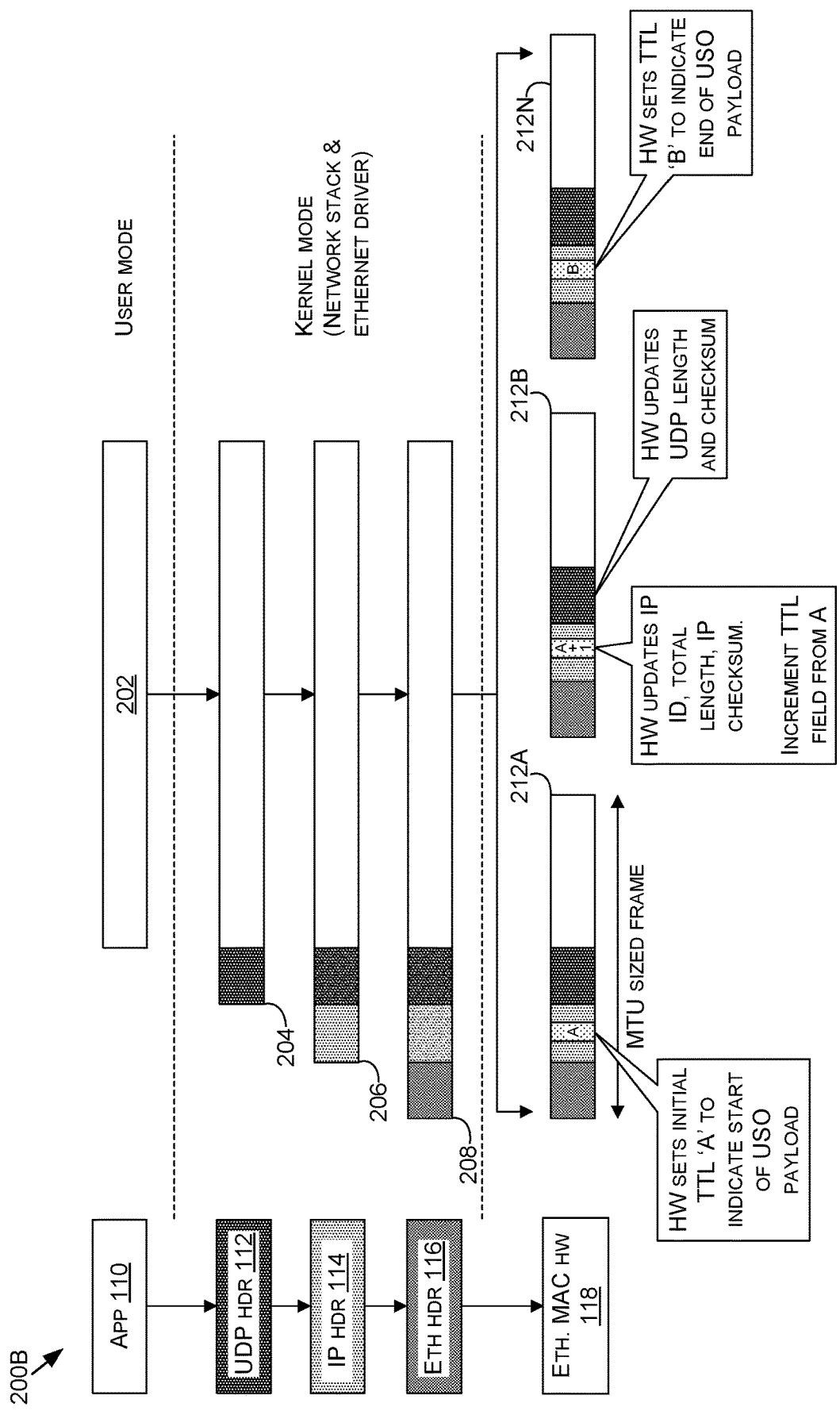
Figure 2C:
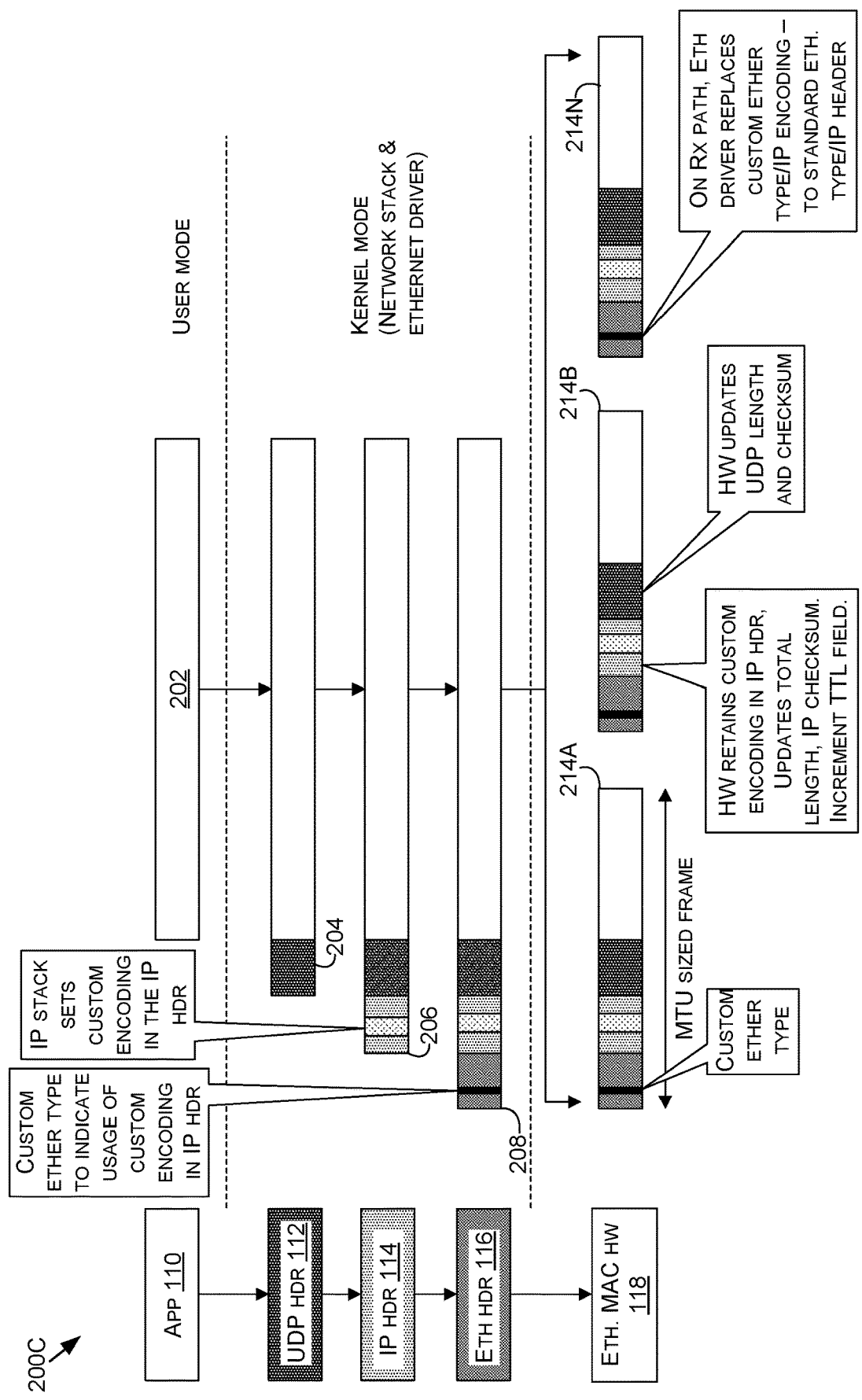

In some embodiments, as described in more detail herein with respect to FIG. 2C, the Ethernet Hardware 116 may be modified to encode the EtherType portion of the Ethernet header to indicate a different protocol type than is actually transmitted, and the Ethernet hardware 128 may be modified to decode the EtherType portion such that the data packet received is processed according to an actual EtherType of the data packet.

The Ethernet MAC hardware 118, 130 of the transmitter 102 and the receiver, respectively, may correspond to hardware configured to interact with the wired, wireless, and/or optical transmission medium for transmitting each maximum transmission unit (MTU) sized packet of data over the network(s) 106. As such, once the network stack—including an application layer, a transport layer, a network layer, and a data link layer—has set the headers of the MTU sized packets corresponding to the application data 202, the Ethernet MAC hardware 118 may control the transmission of the MTU sized packets over the network(s) 106. Similarly, the Ethernet MAC hardware 130 may receive the MTU sized packets and determine the next step for passing the MTU sized packets up the network stack of the receiver 104 for digestion by the application 122.

The system 100 may be configured to leverage legacy fields (e.g., of an IP header, an Ethernet header, etc.) of a UDP packet to insert or encode sequence-aware information. As a result, each MTU sized frame of the overall application payload may be encoded such that the receiver may identify which packets need to be re-assembled, which packet indicates an end of re-assembly, and how to deal with out of order or lost MTU sized frames. For example, when a large UDP payload is segmented via USO, without control of the ordering and/or sequencing at the receiver 104, the system may still determine when to start re-assembling frames to reconstruct the larger payload which was segmented by the transmitter 102. Once re-assembly has started, the receiver may also determine—based on the decoded information from the frames—where the segmentation of the larger payload ends (e.g., which packet or frame is a last packet or frame for the payload). In addition, because the payload may be broken down into any number of segmented frames (e.g., MTU sized frames), the out of order or lost frames may be identified or sequenced according to the decoded information. This may occur prior to the payload being passed to the application such that the application need not be aware of whether the packets were received and/or were received in a proper order.

Now referring to FIG. 2A, FIG. 2A includes a visualization 200A of a process for encoding sequence-aware information into MTU sized frames 210A-210N of a UDP payload. Although only three MTU sized frames 210 are illustrated, this is not intended to be limiting, and any number, N, of MTU sized frames may be generated depending on the size of the payload and the MTU size. For example, application data 202 (e.g., user data, an application header, etc.) may be generated by the application 110 and/or the application layer of a network stack of the transmitter 102, the UDP hardware 112 corresponding to the transport layer of the network stack may append a UDP header 204 to the application data 202, the IP hardware 114 corresponding to the network layer of the network stack may append an IP header 206 to the UDP header 204, and the Ethernet hardware 116 corresponding to a data link layer may append an Ethernet header 208 to the IP header 206. This payload may then be segmented using USO to generate the resulting MTU sized frames 210A-210N, and the individual MTU sized frames 210A-210N may be transmitted—e.g., using the Ethernet MAC hardware 118—over the network(s) 106 to the receiver 104.

In order for the receiver 104 to understand that the MTU sized frames 210A-210N correspond to the larger payload of the application data 202 that has been segmented and sequenced, the IP header 206 may be encoded by leveraging the DF bit, the TTL bits, and the IP ID bits. For example, the DF bit may be set (e.g., to a "1" instead of a "0") to indicate that the MTU sized frames should not be fragmented. When the receiver 104 is configured to re-assemble payloads that have been segmented using USO, the receiver 104 may identify that received segments (e.g., MTU sized frames) are sequenced based on the DF bit being set. In addition to the DF being set, the IP ID field of the IP header 206 may be set to a constant value for each of the segments of the larger payload. For example, the IP hardware 114 may be configured to set the IP ID as the same IP ID for each segmented packet of the larger payload—e.g., as opposed to conventional IP ID fields that increments the IP ID field for each segment or new payload. As such, the DF bit being set may indicate to the receiver 104 that the segment belongs to a larger overall payload, and the IP ID being consistent across segments may indicate to the receiver 104 that the segments are a part of a same larger payload. The receiver 104 may then continue to aggregate segmented packets until a segment or payload is received that does not have the DF bit set, does not have the same IP ID (e.g., within a same 5-tuple stream), and/or is of a different MTU size as the segments corresponding to the application data 202—e.g., one or all of these occurrences may indicate to the receiver 104 that the end of re-assembly has been reached. In some embodiments, the receiver 104 may have a modified generic receive offload (GRO) stack such that the receiver 104 continues to aggregate the packets.

In order to ensure proper ordering and/or sequencing of the received segmented packets identified (e.g., using the DF bit, the IP ID, and/or the MTU size) as corresponding to the larger payload, the TTL and/or TOS fields of the IP header 206 may be leveraged. For example, because the TTL field may need to be non-zero (e.g., "1" for P2P connections) for the receiver 104 to know the packet is valid, the TTL fields may be incremented sequentially (e.g., every number, every other number, every third number, etc.) using values from 2 to 255 (e.g., since TTL is an 8 bit field) as segment numbers for the segmented packets of the larger payload. As a non-limiting example, a first packet may include a "2" encoded in the TTL field, a next packet may include a "3", and so on, until a final segmented packet of the larger payload is generated. In some embodiments, the TOS field may be used for sequencing and/or ordering the segmented packets received. For example, for bits of the TOS field that are unused (e.g., that do not overlap with a priority definition of the packet), the values of these bits may be incremented to correspond to the sequence or ordering of the segmented packets of the larger payload.

In addition, the IP hardware 114 may update the total length, the IP checksum, and/or other header fields of the IP header 206 for each segmented packet, and the UDP hardware 112 may update the UDP length, the checksum, and/or other header fields of the UDP header 204 for each segmented packet.

Using the design of FIG. 2A, a max USO payload length of 372 KB (e.g., 1460×255) may be supported. In addition, this design may allow the receiver 104 to discard an incomplete series of USO segmented packets—e.g., where a sequence number, such as 8, is received but a sequence number of 7 is never received, the receiver 104 may know that the series is incomplete and may discard the packets. Because the design of FIG. 2A is backwards compatible, the packets received that are not of the same IP ID, don't have the DF bit set, etc., may still be processed through the network stack of the receiver 104 as a normal UDP packet. Further, if both the transmitter 102 and the receiver 104 are configured to operate within the design of FIG. 2A, the compute power required of the processor(s) 108, 120 (e.g., CPUs) may be reduced, and thus result in better UDP performance. In addition, because the DF bit is being set for communication between two Ethernet endpoints—different from conventional use of the DF bit for MTU discovery applications by switches and/or intermediate network nodes—when a packet is received that has the DF bit set (e.g., where the transmitter of the packet was unaware of the DF bit use for communication), the packet be held for potential re-assembly by a receiver that is configured to interpret DF bits as corresponding to segmented packets even though the packet is not actually part of a segmented payload. As a result, the packet may be delayed in being processed by the receiver.

Now referring to FIG. 2B, FIG. 2B includes a visualization 200B of a process for encoding sequence-aware information into MTU sized frames 212A-212N of a UDP payload. Although only three MTU sized frames 212 are illustrated, this is not intended to be limiting, and any number, N, of MTU sized frames may be generated depending on the size of the payload and the MTU size. For example, application data 202 (e.g., user data, an application header, etc.) may be generated by the application 110 and/or the application layer of a network stack of the transmitter 102, the UDP hardware 112 corresponding to the transport layer of the network stack may append a UDP header 204 to the application data 202, the IP hardware 114 corresponding to the network layer of the network stack may append an IP header 206 to the UDP header 204, and the Ethernet hardware 116 corresponding to a data link layer may append an Ethernet header 208 to the IP header 206. This payload may then be segmented using USO to generate the resulting MTU sized frames 212A-212N, and the individual MTU sized frames 212A-212N may be transmitted—e.g., using the Ethernet MAC hardware 118—over the network(s) 106 to the receiver 104.

In order for the receiver 104 to understand that the MTU sized frames 212A-212N correspond to the larger payload of the application data 202 that has been segmented and sequenced, the IP header 206 may be encoded by leveraging the IP ID bits, the TTL bits, and/or the TOS bits. For example, the IP ID field of the IP header 206 may be set to increment the IP ID field for each segment or new payload, and the sequence information from the IP ID incrementing may be leveraged to determine the sequence or ordering of the packets. As such, since each segment is carried on an IP packet with unique IP ID, the GRO stack of the receiver 104 may be signaled to start aggregating segmented packets and stop aggregating segmented packets (e.g., belonging to a 5-tuple stream) for re-assembly based on encoded values in the TTL field and/or the TOS field. For example, the TTL field may be set by the IP hardware 114 to an initial value (e.g., "A") that indicates to a receiver 104 that the packet received is an initial segmented packet of a larger payload. The IP hardware 114 may set each successive intermediate packet's TTL field incrementing from the initial value (e.g., "A+1", "A+2", and so on), until the final segmented packet which may be set with a final value (e.g., "B") that indicates to the receiver 104 that the packet is a final segmented packet of the larger payload.

As a non-limiting example, the network stack of the transmitter 102 may insert a TTL value of "2" for a payload X, which may be transmitted as IP ID's 1-6 with TTL "2". The receiver 104 may aggregate all packets with the same TTL value across IP ID's belonging to the same 5-tuple stream. The network stack at the transmitter 102 may then insert a value of "3" for payload Y, which may be transmitted as IP ID's 7-12 with TTL "3", and so on.

In order to ensure proper ordering and/or sequencing of the received segmented packets identified as corresponding to the larger payload, the TTL, TOS, and/or IP ID fields of the IP header 206 may be leveraged. For example, because the TTL field may need to be non-zero (e.g., "1" for P2P connections) for the receiver 104 to know the packet is valid, the TTL fields may be incremented sequentially from the initial value using some subset of values from 2 to 255 as segment numbers for the segmented packets of the larger payload. Similarly, because the IP ID field is incremented for each packet, the IP ID field may be leveraged to determine the ordering or sequence for re-assembling the payload. In some embodiments, the TOS field may be used for sequencing and/or ordering similar to and/or in addition to the TTL field. For example, for bits of the TOS field that are unused (e.g., that do not overlap with a priority definition of the packet), the values of these bits may be incremented to correspond to the sequence or ordering of the segmented packets of the larger payload.

In some embodiments, to support out of order or lost segment detection, the re-assembly signaling and the sequencing signaling may be separated into different header fields—e.g., using two or more of the IP ID, the TTL, and/or the TOS. For example, if the TTL field is used to convey signaling information for start and stop of re-assembly, the TOS field may be used to convey sequencing, and vice versa. Similarly, the IP ID field may convey sequencing while the TTL and/or TOS field convey signaling.

In addition, the IP hardware 114 may update the total length, the IP checksum, and/or other header fields of the IP header 206 for each segmented packet, and the UDP hardware 112 may update the UDP length, the checksum, and/or other header fields of the UDP header 204 for each segmented packet.

Now referring to FIG. 2C, FIG. 2C includes a visualization 200C of a process for encoding sequence-aware information into MTU sized frames 214A-214N of a UDP payload. Although only three MTU sized frames 214 are illustrated, this is not intended to be limiting, and any number, N, of MTU sized frames may be generated depending on the size of the payload and the MTU size. For example, application data 202 (e.g., user data, an application header, etc.) may be generated by the application 110 and/or the application layer of a network stack of the transmitter 102, the UDP hardware 112 corresponding to the transport layer of the network stack may append a UDP header 204 to the application data 202, the IP hardware 114 corresponding to the network layer of the network stack may append an IP header 206 to the UDP header 204, and the Ethernet hardware 116 corresponding to a data link layer may append an Ethernet header 208 to the IP header 206. This payload may then be segmented using USO to generate the resulting MTU sized frames 214A-214N, and the individual MTU sized frames 214A-214N may be transmitted—e.g., using the Ethernet MAC hardware 118—over the network(s) 106 to the receiver 104.

In order for the receiver 104 to understand that the MTU sized frames 214A-214N correspond to the larger payload of the application data 202 that has been segmented and sequenced, the IP header 206 may be encoded by leveraging the IP ID bits, the TTL bits, and/or the TOS bits and/or the Ethernet header 208 may be encoded by leveraging the EtherType bits. For example, the Ethernet hardware 116 may encode a custom value corresponding to a custom EtherType into the EtherType field of the Ethernet header 208. The receiver 104 may be configured to identify and process (e.g., via the Ethernet MAC hardware 130, such as the Ethernet driver) this custom EtherType field as indicative of a received packet corresponding to a larger segmented payload, and the receiver 104 may convert the EtherType to a value corresponding to an IP EtherType prior to passing the packets up the network stack to the application 122.

In order to ensure proper ordering and/or sequencing of the received segmented packets identified as corresponding to the larger payload, the TTL, TOS, and/or IP ID fields of the IP header 206 may be leveraged. For example, because the TTL field may need to be non-zero (e.g., "1" for P2P connections) for the receiver 104 to know the packet is valid, the TTL fields may be incremented sequentially from the initial value using some subset of values from 2 to 255 as segment numbers for the segmented packets of the larger payload. Similarly, because the IP ID field is incremented for each packet, the IP ID field may be leveraged to determine the ordering or sequence for re-assembling the payload. In some embodiments, the TOS field may be used for sequencing and/or ordering similar to and/or in addition to the TTL field. For example, for bits of the TOS field that are unused (e.g., that do not overlap with a priority definition of the packet), the values of these bits may be incremented to correspond to the sequence or ordering of the segmented packets of the larger payload. In some embodiments, to indicate to the receiver 104 that aggregating of packets with custom EtherType should be started or stopped, the TTL fields and/or TOS fields may be encoded with a custom value. For example, to indicate an initial packet for re-assembly, the TTL field and/or the TOS field may be set to (0, 1), and to indicate a final packet for re-assembly, the TTL field and/or the TOS field may be set to (1, 0). As such, one or more header fields of the IP header 206 (e.g., TTL field, TOS field, etc.) may be leveraged to indicate the start and/or stop of re-assembly, and one or more header fields of the IP header 206 (e.g., IP ID field, TTL field, TOS field, etc.) may be leveraged for sequencing and/or ordering.

Once the custom EtherType has been identified by the receiver 104, and the ordering has been determined via the IP header 206, the EtherType value for the reassembled payload may be set to correspond to the IP EtherType (e.g., IPv4, IPv6, etc.), and the IP header fields (e.g., IP ID, TTL, and/or TOS) may be set to correspond to the original payload. As such, this re-assembled payload may then be passed up the network stack of the receiver 104 to be processed as a normal UDP packet.

In addition, the IP hardware 114 may update the total length, the IP checksum, and/or other header fields of the IP header 206 for each segmented packet, and the UDP hardware 112 may update the UDP length, the checksum, and/or other header fields of the UDP header 204 for each segmented packet.

Due to the design of FIG. 2C being backwards compatible, the packets received that are not of a custom EtherType may be processed normally. For example, since devices unaware of the design of FIG. 2C may not use proprietary EtherType fields, packets may be handled unmodified conformant to original network stack implementation. In addition, because the Ethernet driver (e.g., the Ethernet MAC hardware 130) may handle the identification of the custom EtherType, determine the sequencing, re-assemble the packet, and then pass the re-assembled packet up the network stack, the CPU utilization of the receiver 104 may be lowered. Similarly, because the Ethernet driver of the transmitter 102 may generate the segmented packets with custom EtherType, the CPU usage of the transmitter 102 may also be lowered.

Now referring to FIG. 2D, FIG. 2D includes a visualization 200D of a process for encoding sequence-aware information into MTU sized frames 216A-216N of a UDP payload. Although only three MTU sized frames 216 are illustrated, this is not intended to be limiting, and any number, N, of MTU sized frames may be generated depending on the size of the payload and the MTU size. For example, application data 202 (e.g., user data, an application header, etc.) may be generated by the application 110 and/or the application layer of a network stack of the transmitter 102, the UDP hardware 112 corresponding to the transport layer of the network stack may append a UDP header 204 to the application data 202, the IP hardware 114 corresponding to the network layer of the network stack may append an IP header 206 to the UDP header 204, and the Ethernet hardware 116 corresponding to a data link layer may append an Ethernet header 208 to the IP header 206. This payload may then be segmented using USO to generate the resulting MTU sized frames 216A-216N, and the individual MTU sized frames 216A-216N may be transmitted—e.g., using the Ethernet MAC hardware 118—over the network(s) 106 to the receiver 104.

In order for the receiver 104 to understand that the MTU sized frames 216A-216N correspond to the larger payload of the application data 202 that has been segmented and sequenced, the IP header 206 may be encoded by leveraging the IP ID bits, the DF bits, the TTL bits, and/or the TOS bits. For example, the DF bit may be set (e.g., to a "1" instead of a "0") to indicate that the MTU sized frames should not be fragmented. When the receiver 104 is configured to re-assemble payloads that have been segmented using USO, the receiver 104 may identify that received segments (e.g., MTU sized frames) are sequenced based on the DF bit being set. In addition, the IP ID field of the IP header 206 may be set to increment the IP ID field for each segment or new payload, and the sequence information from the IP ID incrementing (and/or a TOS field incrementing) may be leveraged to determine the sequence or ordering of the packets. As such, since each segment is carried on an IP packet with unique IP ID, the GRO stack of the receiver 104 may be signaled to start aggregating segmented packets and stop aggregating segmented packets (e.g., belonging to a 5-tuple stream) for re-assembly based on encoded values in the TTL field. For example, because the TTL field is an 8-bit value, and the high bits (e.g., the $1^{st}$ and $2^{nd}$ bits in the sequence of bits) are generally not used—e.g., because the TTL value is generally not more than 64—the high bits may be leveraged to encode the start and stop of re-assembly to the receiver 104. As such, the high bits may be set by the IP hardware 114 to an initial value (e.g., "(0, 1)") that indicates to a receiver 104 that the packet received is an initial segmented packet of a larger payload. The IP hardware 114 may set each successive intermediate packet's TTL field to an intermediate value (e.g., "(1, 1)"), and the IP hardware 114 may set the final packet to a final value (e.g., "(1, 0)") to indicate to the receiver 104 that the packet is a final segmented packet of the larger payload.

In some embodiments, to support out of order or lost segment detection, the re-assembly signaling and the sequencing signaling may be separated into different header fields—e.g., using two or more of the IP ID, the TTL, and/or the TOS. For example, if the TTL field is used to convey signaling information for start and stop of re-assembly, the TOS field may be used to convey sequencing, and vice versa. Similarly, the IP ID field may convey sequencing while the TTL and/or TOS field convey signaling.

In addition, the IP hardware 114 may update the total length, the IP checksum, and/or other header fields of the IP header 206 for each segmented packet, and the UDP hardware 112 may update the UDP length, the checksum, and/or other header fields of the UDP header 204 for each segmented packet.

Similar to the designs of FIGS. 2A-2C, the design of FIG. 2D may allow the receiver 104 to discard an incomplete series of USO segmented packets—e.g., where a sequence number, such as 8, is received but a sequence number of 7 is never received, the receiver 104 may know that the series is incomplete and may discard the packets. In addition, because the design of FIG. 2D is backwards compatible, the packets received that don't have the DF bit set, don't have the high values of the TTL set, etc., may still be processed through the network stack of the receiver 104 as a normal UDP packet. Further, if both the transmitter 102 and the receiver 104 are configured to operate within the design of FIG. 2D, the compute power required of the processor(s) 108, 120 (e.g., CPUs) may be reduced, and thus result in better UDP performance. Further, and as a result of using only the high bits of the TTL field, the TTL field may still be leveraged by the system to encode TTL-related information (e.g., within the first 6 bits) while still allowing for the high bits to be encoded for re-assembly start and stop indicators.

As a result, when the system 100 is executing according to any of the designs of FIGS. 2A-2D, the receiver 104 may re-assemble the application data 202 for use by the application 122. In this way, data from the application 110 may be transmitted to the application 122 using UDP in a way that is still connectionless, but that is also sequence-aware such that segmented packets may be re-assembled by the receiver 104 in a sequence even where the segmented packets arrive at the receiver 104 out of order. As such, the system 100 may benefit from the latency and bandwidth reductions associated with UDP communications while also achieving the benefits of sequencing more commonly associated with TCP communications.

Figure 3:
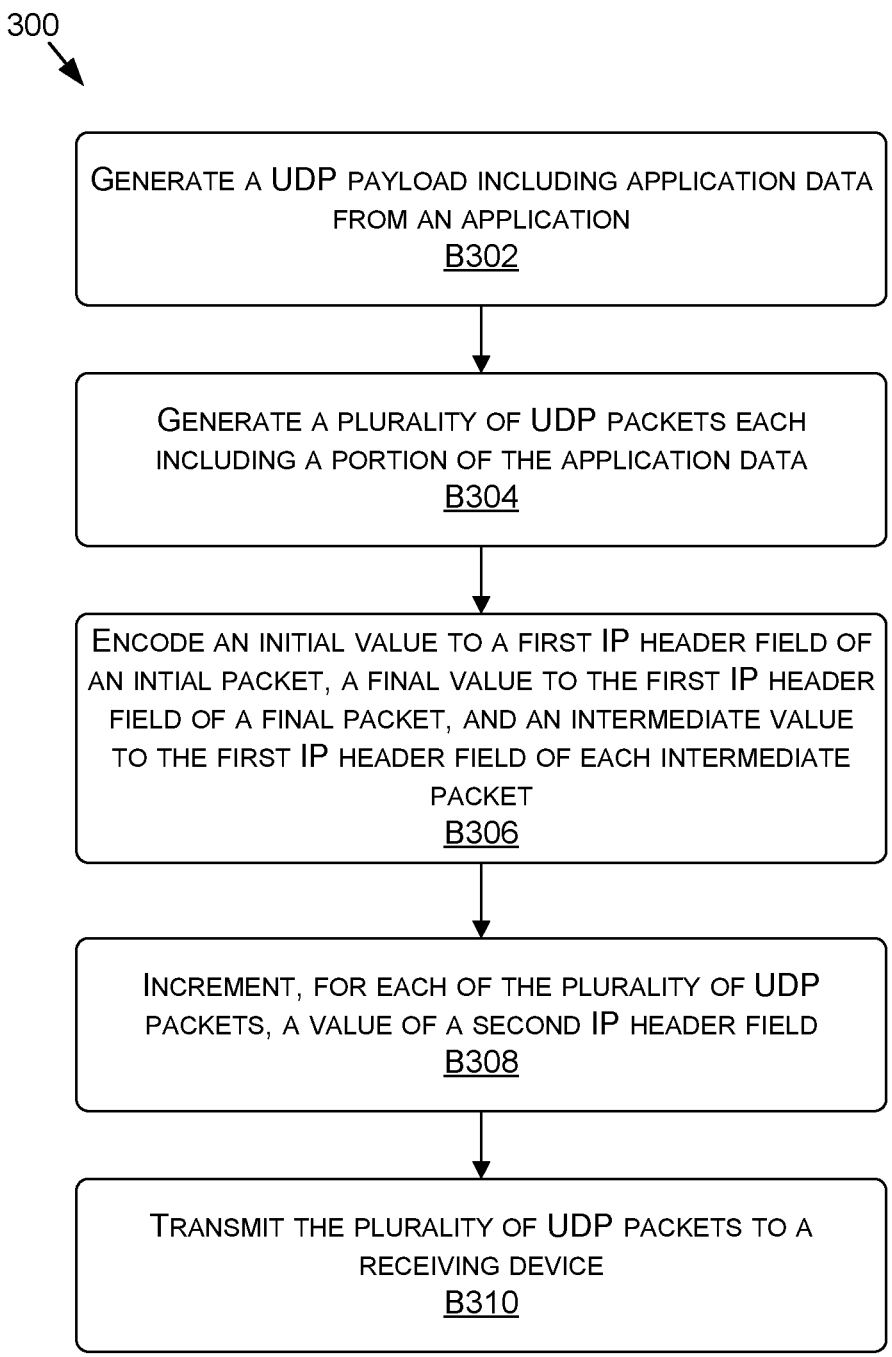
FIG. 3 includes a flow diagram representing a method for sequence-aware UDP networking, in accordance with embodiments of the present disclosure.

Now referring to FIG. 3, each block of method 300, described herein, comprises a computing process that may be performed using any combination of hardware, firmware, and/or software. For instance, various functions may be carried out by a processor executing instructions stored in memory. The method 300 may also be embodied as computer-usable instructions stored on computer storage media. The method 300 may be provided by a standalone application, a service or hosted service (standalone or in combination with another hosted service), or a plug-in to another product, to name a few. In addition, method 300 is described, by way of example, with respect to the system of FIG. 1 and the visualization 200D of FIG. 2D. However, this method 300 may additionally or alternatively be executed by any one system, or any combination of systems, including, but not limited to, those described herein.

FIG. 3 includes a flow diagram representing a method 300 for sequence-aware UDP networking, in accordance with embodiments of the present disclosure. The method 300, at block B302, includes generating a UDP payload including application data from an application. For example, a payload may be generated that includes the application data 202, an application header, and a UDP header 204.

The method 300, at block B304, includes generating a plurality of UDP packets each including a portion of the application data. For example, the transmitter—e.g., using the IP hardware 114—may execute a USO operation to segment the UDP payload into a plurality of MTU sized frames 216. Each MTU sized frame 216 may include a portion of the application data 202 such that when the plurality of MTU sized frames 216 are re-assembled, the application data 202 may be re-assembled.

The method 300, at block B306, includes encoding an initial value to a first IP header field of an initial packet, a final value to the first IP header field of a final packet, and an intermediate value to the first IP header field of each intermediate packet. For example, the IP hardware 114 may encode an initial value (e.g., "(0, 1)") to a TTL field of the first MTU sized frames 216A, a final value (e.g., "(1, 0)") to the TTL field of the last MTU sized frames 216N, and an intermediate value (e.g., "(1, 1)") to the TTL field of each other MTU sized frames 216A+1 to 216N−1. As such, these values may indicate to the receiver 104 when to start aggregating packets and when to stop aggregating packets, as well as which packets correspond to the total payload.

The method 300, at block B308, includes incrementing, for each of the plurality of UDP packets, a value of a second IP header field. For example, the IP hardware 114 may increment the IP ID field starting with the first MTU sized frame 216A and ending with the last MTU sized frame 216N.

The method 300, at block B310, includes transmitting the plurality of UDP packets to a receiving device. For example, the transmitter 102—e.g., using an Ethernet driver, such as the Ethernet MAC hardware 118—may transmit each of the plurality of MTU sized frames 216 over the network(s) 106.

Example Computing Device

Figure 4:
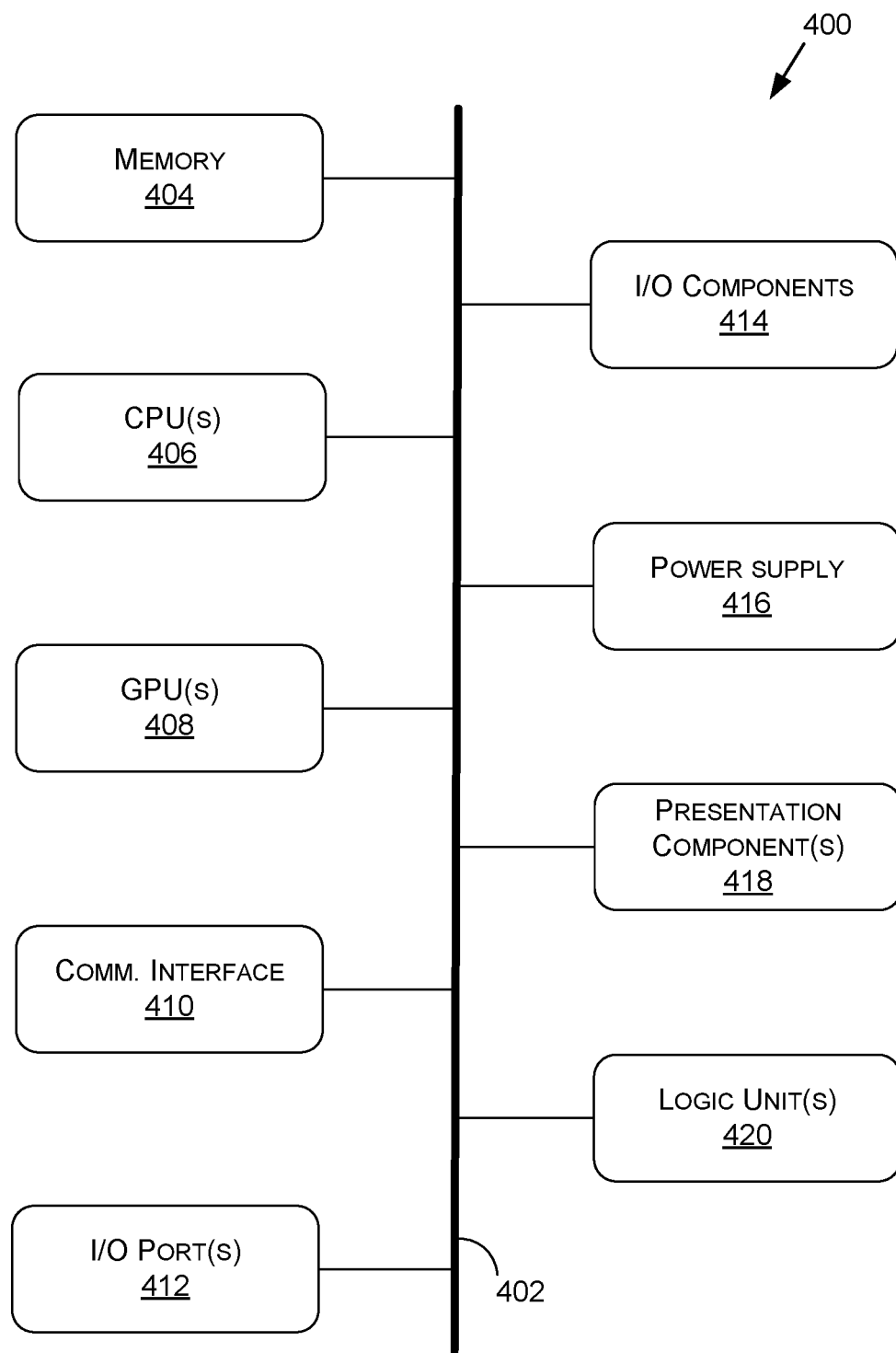
FIG. 4 is a block diagram of an example computing device suitable for use in implementing some embodiments of the present disclosure.

FIG. 4 is a block diagram of an example computing device(s) 400 suitable for use in implementing some embodiments of the present disclosure. Computing device 400 may include an interconnect system 402 that directly or indirectly couples the following devices: memory 404, one or more central processing units (CPUs) 406, one or more graphics processing units (GPUs) 408, a communication interface 410, input/output (I/O) ports 412, input/output components 414, a power supply 416, one or more presentation components 418 (e.g., display(s)), and one or more logic units 420.

Although the various blocks of FIG. 4 are shown as connected via the interconnect system 402 with lines, this is not intended to be limiting and is for clarity only. For example, in some embodiments, a presentation component 418, such as a display device, may be considered an I/O component 414 (e.g., if the display is a touch screen). As another example, the CPUs 406 and/or GPUs 408 may include memory (e.g., the memory 404 may be representative of a storage device in addition to the memory of the GPUs 408, the CPUs 406, and/or other components). In other words, the computing device of FIG. 4 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 4.

The interconnect system 402 may represent one or more links or busses, such as an address bus, a data bus, a control bus, or a combination thereof. The interconnect system 402 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 406 may be directly connected to the memory 404. Further, the CPU 406 may be directly connected to the GPU 408. Where there is direct, or point-to-point connection between components, the interconnect system 402 may include a PCIe link to carry out the connection. In these examples, a PCI bus need not be included in the computing device 400.

The memory 404 may include any of a variety of computer-readable media. The computer-readable media may be any available media that may be accessed by the computing device 400. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 404 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 400. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 406 may be configured to execute at least some of the computer-readable instructions to control one or more components of the computing device 400 to perform one or more of the methods and/or processes described herein. The CPU(s) 406 may each include one or more cores (e.g., one, two, four, eight, twenty-eight, seventy-two, etc.) that are capable of handling a multitude of software threads simultaneously. The CPU(s) 406 may include any type of processor, and may include different types of processors depending on the type of computing device 400 implemented (e.g., processors with fewer cores for mobile devices and processors with more cores for servers). For example, depending on the type of computing device 400, the processor may be an Advanced RISC Machines (ARM) processor implemented using Reduced Instruction Set Computing (RISC) or an x86 processor implemented using Complex Instruction Set Computing (CISC). The computing device 400 may include one or more CPUs 406 in addition to one or more microprocessors or supplementary co-processors, such as math co-processors.

In addition to or alternatively from the CPU(s) 406, the GPU(s) 408 may be configured to execute at least some of the computer-readable instructions to control one or more components of the computing device 400 to perform one or more of the methods and/or processes described herein. One or more of the GPU(s) 408 may be an integrated GPU (e.g., with one or more of the CPU(s) 406 and/or one or more of the GPU(s) 408 may be a discrete GPU. In embodiments, one or more of the GPU(s) 408 may be a coprocessor of one or more of the CPU(s) 406. The GPU(s) 408 may be used by the computing device 400 to render graphics (e.g., 3D graphics) or perform general purpose computations. For example, the GPU(s) 408 may be used for General-Purpose computing on GPUs (GPGPU). The GPU(s) 408 may include hundreds or thousands of cores that are capable of handling hundreds or thousands of software threads simultaneously. The GPU(s) 408 may generate pixel data for output images in response to rendering commands (e.g., rendering commands from the CPU(s) 406 received via a host interface). The GPU(s) 408 may include graphics memory, such as display memory, for storing pixel data or any other suitable data, such as GPGPU data. The display memory may be included as part of the memory 404. The GPU(s) 408 may include two or more GPUs operating in parallel (e.g., via a link). The link may directly connect the GPUs (e.g., using NVLINK) or may connect the GPUs through a switch (e.g., using NVSwitch). When combined together, each GPU 408 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 406 and/or the GPU(s) 408, the logic unit(s) 420 may be configured to execute at least some of the computer-readable instructions to control one or more components of the computing device 400 to perform one or more of the methods and/or processes described herein. In embodiments, the CPU(s) 406, the GPU(s) 408, and/or the logic unit(s) 420 may discretely or jointly perform any combination of the methods, processes and/or portions thereof. One or more of the logic units 420 may be part of and/or integrated in one or more of the CPU(s) 406 and/or the GPU(s) 408 and/or one or more of the logic units 420 may be discrete components or otherwise external to the CPU(s) 406 and/or the GPU(s) 408. In embodiments, one or more of the logic units 420 may be a coprocessor of one or more of the CPU(s) 406 and/or one or more of the GPU(s) 408.

Examples of the logic unit(s) 420 include one or more processing cores and/or components thereof, such as Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 410 may include one or more receivers, transmitters, and/or transceivers that enable the computing device 400 to communicate with other computing devices via an electronic communication network, included wired and/or wireless communications. The communication interface 410 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet.

The I/O ports 412 may enable the computing device 400 to be logically coupled to other devices including the I/O components 414, the presentation component(s) 418, and/or other components, some of which may be built in to (e.g., integrated in) the computing device 400. Illustrative I/O components 414 include a microphone, mouse, keyboard, joystick, game pad, game controller, satellite dish, scanner, printer, wireless device, etc. The I/O components 414 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 400. The computing device 400 may be include depth cameras, such as stereoscopic camera systems, infrared camera systems, RGB camera systems, touchscreen technology, and combinations of these, for gesture detection and recognition. Additionally, the computing device 400 may include accelerometers or gyroscopes (e.g., as part of an inertia measurement unit (IMU)) that enable detection of motion. In some examples, the output of the accelerometers or gyroscopes may be used by the computing device 400 to render immersive augmented reality or virtual reality.

The power supply 416 may include a hard-wired power supply, a battery power supply, or a combination thereof. The power supply 416 may provide power to the computing device 400 to enable the components of the computing device 400 to operate.

The presentation component(s) 418 may include a display (e.g., a monitor, a touch screen, a television screen, a heads-up-display (HUD), other display types, or a combination thereof), speakers, and/or other presentation components. The presentation component(s) 418 may receive data from other components (e.g., the GPU(s) 408, the CPU(s) 406, etc.), and output the data (e.g., as an image, video, sound, etc.).

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:
   generating a user diagram protocol (UDP) payload including application data from an application;
   generating a plurality of UDP packets each including a portion of the application data;
   encoding an initial value to an internet protocol (IP) header field of an initial packet of the plurality of UDP packets, a final value to the IP header field of a final packet of the plurality of UDP packets, and an intermediate value to the IP header field of each intermediate packet of the plurality of UDP packets between the initial packet and the final packet, the IP header field including one of a time to live (TTL) IP header field or a type or service (TOS) IP header field;

incrementing, for each of the plurality of UDP packets from the initial packet to the final packet, a value of an IP identification (ID) IP header field; and transmitting the plurality of UDP packets to a receiving device.

2. The method of claim 1, wherein the plurality of UDP packets, when received by the receiving device, cause the reeving device to re-assemble the UDP payload using the plurality of UDP packets according to a sequence defined by the value of the IP ID IP header field for each of the plurality of UDP packets.

3. The method of claim 1, wherein the IP header field is the TOS IP header field, and the initial value, the intermediate value, and the final value are encoded to one or more bits of the TOS IP header field that are not included in a priority definition.

4. The method of claim 1, wherein the initial value indicates to the receiving device to start aggregating packets, and the final value indicates to the receiving device to stop aggregating packets.

5. The method of claim 1, further comprising setting a don't fragment (DF) bit to 1.

6. The method of claim 1, wherein the IP header field is the TTL IP header field, and the initial value, the final value, and the intermediate value are encoded to two highest bits of the TTL IP header field.

7. The method of claim 1, wherein the generating the plurality of UDP packets includes executing a UDP segmentation offload (USO) operation.

8. The method of claim 1, wherein the initial value, the final value, and the intermediate value are each different from the other, and the initial value, the final value, and the intermediate value are selected from: (0, 1), (1, 0), and (1, 1).

9. A system comprising:
one or more hardware processing units;
one or more memory units;
user datagram protocol (UDP) hardware to generate a UDP payload including application data from an application;
internet protocol (IP) hardware to:
  generate a plurality of UDP packets each including a portion of the application data;
  encode values to a time to live (TTL) field of each of the plurality of UDP packets to indicate at least a first packet, a last packet, and intermediate packets between the first packet and the last packet of the plurality of UDP packets to be aggregated by a receiving device; and
  increment, for each of the plurality of UDP packets from the first packet to the last packet, a value of an IP identification (ID) field; and
a driver to transmit the plurality of UDP packets to the receiving device.

10. The system of claim 9, further comprising Ethernet hardware to encode a custom EtherType to an EtherType field of each of the plurality of UDP packets to indicate to the receiving device that the plurality of UDP packets are to be aggregated.

11. The system of claim 9, wherein the driver is an Ethernet driver.

12. The system of claim 9, wherein the plurality of UDP packets, when received by the receiving device, cause the receiving device to re-assemble the UDP payload using the plurality of UDP packets according to a sequence defined by the value of the IP ID field for each of the plurality of UDP packets.

13. The system of claim 9, wherein a first value of the values corresponding to the first packet indicates to the receiving device to start aggregating packets, and a second value of the values corresponding to the final packet indicates to the receiving device to stop aggregating packets.

14. The system of claim 9, further comprising encoding a 1 to a don't fragment (DF) bit of each of the plurality of UDP packets.

15. The system of claim 9, wherein the values encoded to the TTL field are encoded to two highest bits of the TTL field.

16. A method comprising:
executing a user datagram protocol (UDP) segmentation offload (USO) operation on a UDP data payload to generate a plurality of segmented data packets, each segmented data packet of the plurality of segmented data packets including:
  a don't fragment (DF) bit set to 1;
  two highest bits of a time to live (TTL) field set to one of an initial value, a final value, or an intermediate value; and
  an internet protocol (IP) identification (ID) field set to a value sequentially incremented with respect to each other segmented data packet of the plurality of segmented data packets; and
transmitting the plurality of segmented data packets for processing by a receiving device.

17. The method of claim 16, wherein the initial value, the final value, and the intermediate value are each encoded to at least one of the plurality of segmented data packets.

18. The method of claim 16, wherein the plurality of segmented packets, when received by the receiving device, cause the receiving device to re-assemble the UDP data payload using the plurality of segmented packets and according to a sequence defined by the value of IP ID field for each of the plurality of segmented packets.

19. The method of claim 16, wherein the initial value indicates to the receiving device to start aggregating packets, and the final value indicates to the receiving device to stop aggregating packets.

20. The method of claim 16, wherein a segmented packet of the plurality of segmented packets associated with the initial value includes a lowest value in the IP ID field with respect to each other segmented packet of the plurality of segmented packets.

* * * * *